United States Patent [19]
Edwards

[11] 3,805,371
[45] Apr. 23, 1974

[54] METHODS OF PRODUCTION OF WHEELS AND OTHER ARTICLES BY FRICTION WELDING

[75] Inventor: Michael Frederick Edwards, Wolverhampton, England

[73] Assignee: GKN Sankey Limited, Bilston, Stafford, England

[22] Filed: Jan. 19, 1972

[21] Appl. No.: 218,899

[30] Foreign Application Priority Data
Jan. 25, 1971 Great Britain...................... 3110/71
Jan. 25, 1971 Great Britain...................... 3111/71

[52] U.S. Cl................ 29/470.3, 29/159.01, 156/73, 228/2
[51] Int. Cl....................................... B23k 27/00
[58] Field of Search ......... 228/2; 29/470.3, 159.01; 156/73; 301/63, 65

[56] References Cited
UNITED STATES PATENTS
3,235,312 2/1966 Hollander..................... 29/470.3 X
3,393,851 7/1968 Funk et al............................. 228/2
3,568,299 3/1971 Calton et al........................ 228/2 X
3,611,535 10/1971 Nobach........................... 29/470.3 X
3,702,169 11/1972 Bonneville et al..................... 228/2

Primary Examiner—J. Spencer Overholser
Assistant Examiner—Robert J. Craig
Attorney, Agent, or Firm—Merriam, Marshall, Shapiro & Klose

[57] ABSTRACT

A method of and apparatus for frictional welding disc and rim portions of a vehicle wheel on which these portions are held by supports respectively engaging stud holes or the edge of a central aperture in the disc portion and engaging tyre seating surfaces on the rim portion, the supports themselves having axially interfitting pilot parts to provide control against radial eccentricity and/or angular deviation between reference axes of the disc and rim portions as defined by the engaged faces thereof.

10 Claims, 6 Drawing Figures

METHODS OF PRODUCTION OF WHEELS AND OTHER ARTICLES BY FRICTION WELDING

BACKGROUND OF THE INVENTION

1. Field of the Invention

This invention relates to a method of and apparatus for effecting friction or other welding of workpieces to establish a welded junction between them, such workpieces each having a reference axis and being required to be joined in such mutual relation that they are concentric or have some other predetermined positional relation. Concentricity involves a relationship of parallelism between the reference axes and also radial coincidence. The reference axes may in each case be defined by reference faces on the workpieces. In order fully to define the reference axes the reference faces will ordinarily include a portion presented radially and a portion presented axially, but in some cases a single portion which is oblique to the reference axis may define both the radial and angular positions of the reference axis.

Friction welding is usually employed to effect a welded junction between contact faces on the respective workpieces, such contact faces themselves being surfaces of revolution with respect to the reference axis and formed by a generatrix which is usually a line extending radially at right angles to the reference axis, but may in some cases extend obliquely through the reference axis.

A specific field of application of the present invention is to wheels, (hereinafter referred to as being of the kind specified), each comprising a rim portion adapted to receive a pneumatic tyre, and a disc portion which is united by fusion to the rim portion and serves to support the latter. The invention also relates to a method of making a wheel of the kind specified.

2. Description of the Prior Art

Heretofore the method and apparatus of friction welding to which the present invention generally relates has involved supporting each of the workpieces by a respective supporting means forming part of a friction welding apparatus by which the method is performed, and one at least of the supporting means is normally mounted for rotation relatively to the other about the reference axis. Accuracy with which a concentric relationship is achieved between the workpieces when the welded junction is completed depends upon the degree of freedom afforded by the supporting means which carries each of the rotary workpieces. Thus in friction welding machines one workpiece supporting means is usually mounted in a bearing for rotation about an axis, and the other workpiece supporting means is usually mounted non-rotatably but has freedom to move axially, e.g. along a guide means. There may be play in the guide means permitting of both radial and angular displacement of the non-rotatable supporting means, and usually there is play in the bearing also.

Further, such bearing has to withstand high speeds of rotation and also substantial axial loading in consequence of the force which is necessarily applied axially of the reference axis in order to achieve the necessary contact pressure between the contact faces of the workpieces.

Each workpiece further is often engaged and held by its associated workpiece supporting means at a position which is some distance from the bearing or structure which carries the workpiece supporting means itself, and consequently, due to flexure or distortion of the workpiece supporting means, there is a further possible source of departure from a desired coaxial relation between the workpieces in the finished product.

Whilst the foregoing exposition is illustrative of the problem, it will be understood that friction welding methods and apparatus may be employed to secure together workpieces in a predetermined relative position other than the concentric position above referred to, and the present invention aims to deal both specifically with the problem of achieving a coaxial relation and generally with the problem of achieving any desired relative position between the workpieces in the finished product.

Specifically in the application of the invention to wheels of the kind specified, it is to be noted that the rim portion of the wheel has two radially outwardly presented and axially spaced face portions which in use are adapted to be engaged by the bead or inner edge of the outer cover of a pneumatic tyre, and are hereinafter referred to as "tyre seating faces." It is important that the tyre seating faces shall be accurately concentric with the axis about which the wheel is rotated when in use. This is the axis of rotation of the hub. The term "concentric" involves both a parallel relationship between the hub axis and axes defined by the tyre seating faces, and also radial coincidence between the hub axis and the centres defined by each of the tyre seating faces.

The disc portion is formed with a plurality of holes adjacent to, but spaced outwardly of, the inner edge of the disc portion for the passage therethrough of respective correspondingly angularly spaced studs on a hub on which the wheel is supported when in use. The radial position of the wheel with respect to the hub, and hence the relationship of radial coincidence referred to, is determined either by the faces which form wholly or in part the boundaries of these holes, or is determined by the inner edge face of the disc portion of the wheel which may engage the radially outwardly presented face of a spigot, rib or the like formation which is accurately concentric with the axis of rotation of the hub. The parallel relationship between the hub axis and the axes of the tyre seating faces is determined by the inner side face of the disc portion which in use abuts the outer side face of the hub or possibly abuts shoulders on the studs. In some cases a single reference face can ensure both radial and angular coincidence, e.g. studs having frusto-conical nuts or shoulders cooperating with frusto-conical boundaries of the holes in the disc portion of the wheel. It is, of course, appreciated that the actual axis of rotation of the hub must be concentric with the hub axis defined by the studs of the hub, or the spigot or the like of the hub, or possibly both of these parts of the hub, if both are employed to locate the wheel.

At the present time it is common practice to support one of the two structurally separate components, for example, the rim portion, then assemble with the rim portion a preformed disc portion. The contacting faces of the rim portion and the disc portion (herein called contact faces) are made of such a form that intrinsically they provide both the relationship of radial coincidence and the relationship of parallelism already explained as between axes defined by these two contact faces themselves.

It is inevitable, due to the manufacturing process, that there shall be some departure of concentricity between the axis of the rim portion and the axis of said contact face of the rim portion preparatory to welding. Such departure may be represented by a radial eccentricity measured radially having a value $e1$ and an angular deviation $\alpha 1$.

Likewise it is inevitable that there shall be some departure from concentricity between the axis of the disc portion and the axis of the companion contact face of the disc portion preparatory to welding. This departure may give rise to a radial eccentricity $e2$ and an angular deviation $\alpha 2$.

With the method of manufacture as at present practiced, the two eccentricities $e1$, $e2$ and two angular deviations $\alpha 1$ $\alpha 2$ may be additive and thereby increase the departure from concentricity of the tyre seating faces of the rim portion with the axis about which the wheel is actually rotated when mounted on an associated hub. Also, because the contact faces, which typically present a step and rebate respectively, fit with a variable degree of looseness (or interference), the actual fitting operation can involve a further eccentricity $e3$ which may be additive with respect to $e1$ and $e2$. Similarly there may be an additional angular deviation $\alpha 3$.

The main object of the present invention is to provide an improved method applicable specifically but not exclusively to the manufacture of wheels of the kind specified and an apparatus therefor, by means of which the problems above referred to are overcome or reduced.

SUMMARY OF THE INVENTION

From one aspect the present invention resides in a method of friction welding comprising holding workpieces in respective workpiece supporting means in relative positions for friction welding in each case by or with respect to their reference faces, subjecting the workpieces whilst so supported to a force in a direction such as to cause contact faces of the workpieces to be engaged under pressure and to undergo relative movement in a mode to produce rubbing contact between the contact faces causing layers of material in the workpieces adjacent to the contact faces to be raised to a temperature at which a welded junction can be established between them, causing, or permitting, said relative movement to cease and continuing to exert force, herein called the forging force, between the contact faces to produce relative movement between the workpiece supporting means causing intermingling or upset of said layers of material to establish the required junction, controlling the radial and/or angular relation between the workpieces at least while the forging force is being exerted by engagement of cooperating parts (herein called pilot parts) on the workpiece supporting means respectively additionally to any control already inherent in the mounting of each workpiece supporting means themselves on a body.

As applied specifically to the manufacture of wheels of the kind specified, the invention resides in a method comprising assembling two wheel components, one of which includes a reference face defining the axis of the disc portion, and the other of which includes as its reference face the tyre seating faces defining the axis of the rim portion, with respective contact faces of the two portions in engagement with each other, or positioned sufficiently closely to permit of uniting of the two portions by fusion, locating each of said wheel components in a position determined by its reference face, so that the axes of the components are concentric in respect of radial eccentricity or angular deviation, or both, and uniting the two portions by fusion, while the form of, proximity of, or condition of, material at the contact faces admits of uniting of the two components in respective positions determined by their reference faces. Location of either component by its reference face is intended to include the case where location is effected using an equivalent face so close to, or so accurately positioned relative to, the reference face as to be equivalent thereto.

The preferred method is one in which the two components are welded by friction welding. In this case the method includes the further preferred step of holding the two components in respective supports which have pilot parts engaging with each other to provide accurate control as to radial eccentricity and angular deviation between the axes of the two components.

Further, according to the invention, there is provided a friction welding apparatus comprising respective supporting means for supporting workpieces to be welded by or with respect to their reference faces, force applying means for applying to one at least of the supporting means a force in a direction to bring contact faces of respective workpieces into engagement under pressure when the apparatus is in use, driving means for moving one at least of the workpiece supporting means in a mode to produce rubbing contact under pressure between said contact faces, characterised in that the workpiece supporting means have respective pilot parts which are arranged to cooperate with each other to provide control in the radial and/or angular position of the workpiece supporting means relative to each other additional to any control inherent in the mounting of each workpiece supporting means on a body of the apparatus.

BRIEF DESCRIPTION OF THE DRAWINGS

The invention will now be described, by way of example, with reference to the accompanying drawings wherein.

DESCRIPTION OF THE PREFERRED EMBODIMENTS

Figure 1:
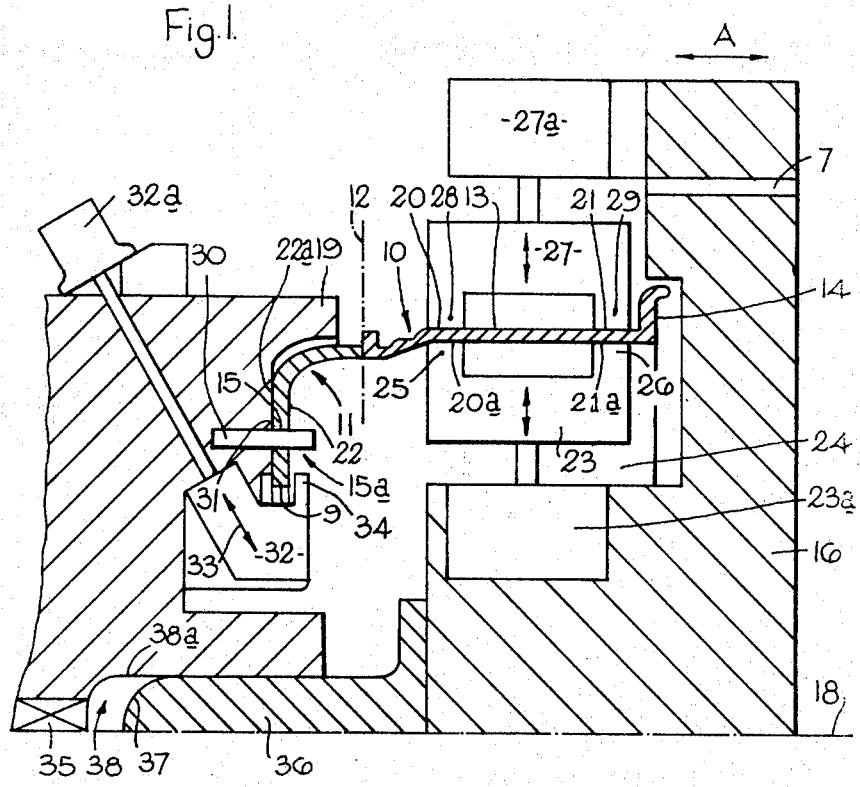
FIG. 1 illustrates one manner of performance of the invention, one embodiment of apparatus in accordance therewith, and one embodiment of product in accordance therewith in cross-section in a vertical plane through the diameter of the reference axis of both components or workpieces.

The product illustrated in FIG. 1 is a road wheel such as a truck wheel which comprises two components 10 and 11 which are required to be united by fusion at contact faces in a plane indicated by the broken line 12. As illustrated the component 10 is the main part of the rim portion of a wheel having a flat base 13 and a fixed flange 14 at one side, the other part constituting a detachable flange similar to the flange 14 and omitted from the illustrations for clarity.

The component 11 constitutes the disc portion of the wheel and in the embodiment illustrated in FIG. 1 is formed with a plurality of holes 15a through which studs on the hub of the vehicle extend when the wheel is in use.

The components 10 and 11 are each formed of materials having welding compatibility, preferably a metal such as mild steel, and are preferably of like composition.

Although for convenience the two components comprise, in the one case, the disc portion and, in the other case, the main part of the rim portion of the wheel, it is to be understood that there may be cases where the plane 12 in which the contact faces lie is situated at some other position, for example somewhat to the right of the position illustrated in FIG. 1, so that one component would include the disc portion of the wheel and some part of the rim portion, and the other component would be a further part of the rim portion.

The uniting of the two components together in the plane 12 of the contact faces is preferably effected by friction welding and for simplicity only a fragment of the friction welding apparatus is illustrated.

Figure 6:
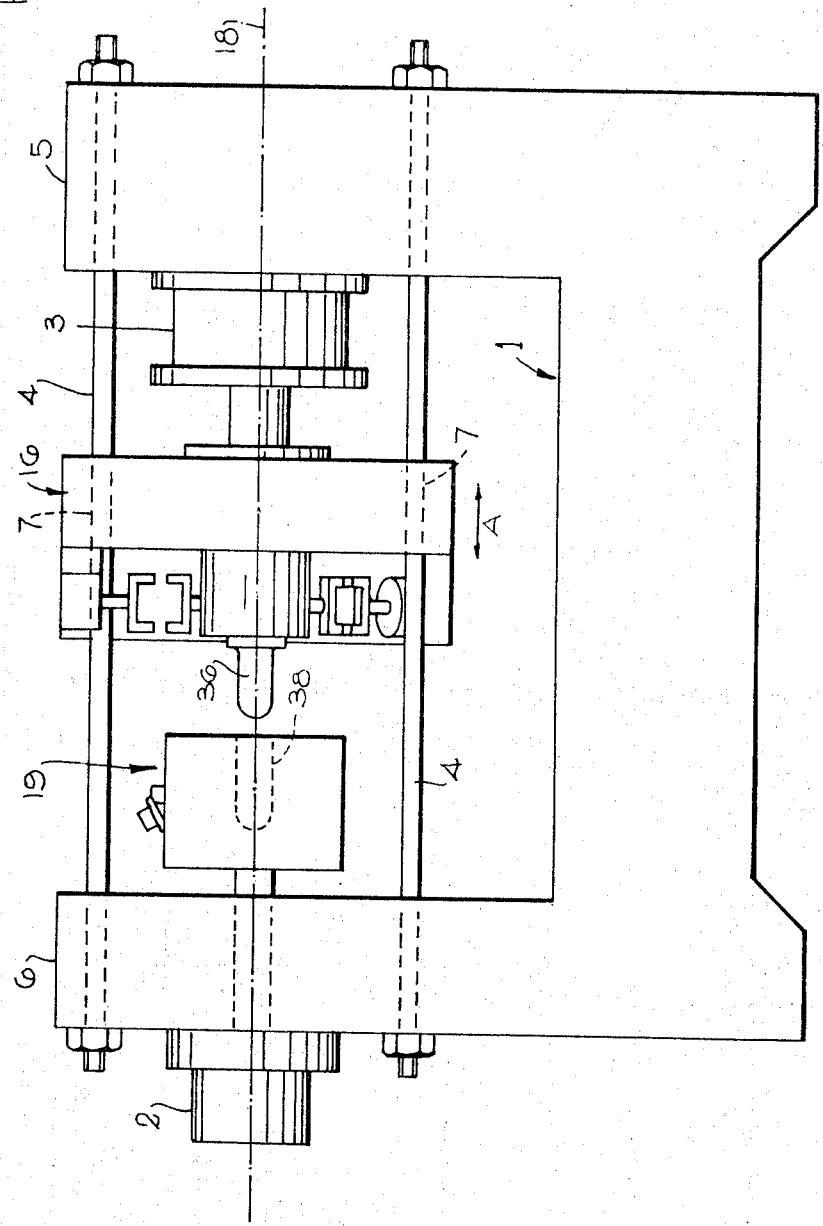
FIG. 6 is a view in side elevation showing the general arrangement of a complete machine incorporating the parts shown in FIG. 1 or FIGS. 2, 3 or 4.

This comprises a rotary workpiece support 19 which is supported in turn by a bearing 35 from a body 1 (FIG. 6) and is driven rotatably by a suitable motor 2 while remaining in a fixed axial position with respect to the axis of rotation 18.

The other workpiece support 16 is non-rotatably supported from the body but is adapted to move lengthwise of the axis 18 as indicated by the arrow A by provision of a suitable force applying device such as a hydraulic piston and cylinder unit 3.

The workpiece support 16 is supported for sliding movement parallel to the axis 18 by guide means comprising tie rods connecting upstanding beads 5 and 6 at opposite ends of the body 1 and passing through guide bores 7 in the support 16.

The component 10 of the wheel includes two radially presented tyre seating faces 20 and 21 which when the wheel is in use are engaged by the beads of the tyre. These faces 20 and 21 collectively constitute the reference face of the component 10 and collectively define a reference axis. At the inner side of the rim portion this presents support faces 20a, 21a which may be used to hold the rim portion during welding to the disc portion. The faces 20a, 21a are positionally related to 20, 21, respectively, only by the thickness of the circumferential wall of the rim portion and for practical purposes provide also a good datum for determining the reference axis of the component 10.

The component 11 also has a reference face, one portion of which is constituted by the inner boundaries 15 of the holes 15a, and another portion 22 of which is constituted by the inner side face of the component 11. In use the radial position of the reference axis of component 11 will be determined by engagement of the inner boundaries 15 of the holes 15a with the studs of a wheel hub, and the angular relation between the hub axis and the reference axis of the component 11 will be determined by engagement of the face portion 22 with an opposing face on the hub. Again, there is a support face 22a on the opposite side of the disc portion from the face 22 which is positionally related to the latter only by the thickness of the wall of the disc portion. Accordingly 22a is as good as 22 in regard to acting as a datum to determine the angular position of the reference axis of the disc portion.

The supports 16 and 19 of the friction welding machine are designed to hold their respective workpieces by engagement with holding faces on respective workpieces and which may be either the reference faces or the adjacent support faces already referred to and which having regard to manufacturing tolerances, can be taken as having positional relationship with respect to the reference axis of the workpieces which is as accurate as exists for the reference faces themselves.

Thus, in the case of the workpiece support 16, the component 10 may be supported by a plurality of angularly spaced inner jaw members 23 which are movable radially by any suitable devices such as piston and cylinder units 23a energised by pressure fluid. The jaw members 23 move in radial guideways 24 formed on the body of the supporting means 16. The jaw members 23 each have radially projecting axially spaced limbs 25, 26 for contacting the support faces 20a, 21a of the component 10 immediately opposite to the faces 20 and 21. Since the thickness of the metal from which the component 10 is formed can be accurately controlled and the supporting means 16 is manufactured to have sufficient precision to ensure a concentric relation between the gripping faces of the limbs 25 and 26 and the axis 18, it can be taken that use of jaw members 23 alone will provide the required accuracy of support of the component 10 with respect to the workpiece supporting means 16.

However, there may be provided alternatively, or in addition, a plurality of outer jaw members 27 having limbs 28 and 29 which engage directly with the faces 20 and 21. The jaw members 27 may be operated by piston and cylinder units 27a energised by pressure fluid. Whether an inner or an outer set of jaw members or both such sets are provided, it will be understood that these jaw members perform the dual function of accurately positioning the component 10 in concentric relation with the axis 18 as well as imparting the necessary restraint to rotational movement to the component 10 by gripping same frictionally.

It will further be evident that since the faces 20 and 21 (or 20a and 21a) are spaced axially from each other, the establishment of each such face with its centre in coincidence with the axis 18 necessarily ensures that the reference axis which is defined collectively by the faces 20 and 21 (or 20a and 21a) is both parallel to and radially coincident with the axis 18.

The workpiece support 19 provides similar facilities for locating the component 11 accurately in concentric relation with the axis 18.

Thus the body of the workpiece support carries pins 30 which, as illustrated, are a close sliding fit in the holes 15a and, therefore, engage the inner boundaries 15 of these holes and provide accurate radial positioning of the component 11 relative to the axis 18 to ensure that there is coincidence between the centre of the pitch circle on which the holes 15a lie and the axis 18.

The body of the support 19 further includes an annular face 31 which engages the support face 22a of the component 11 immediately opposite to the reference face 22. Again, manufacturing tolerances are sufficiently accurate to avoid any significant variation in thickness with the component 11 and consequently engagement between the face 31 and the component 11 provides as satisfactory a location for the component as would be attained were contact made directly with the face 22.

To hold the component 11 tightly in engagement with the face 31, the support 19 may include any suitable gripping members. For example, jaw members 32 are illustrated movable in guideways extending oblique to the axis 18 as shown by the arrow 33, so that fingers 34 on the jaw members can be withdrawn inwardly of the inner boundary 9 of the component 11 to allow same to be assembled and removed from the workpiece support, and also to urge the component 11 into contact with the face 31. The jaw members 32 may be operated by any suitable devices such as piston and cylinder unit 32a energised by pressure fluid.

The guide means 7 and the bearing 35 each exercise control over the positional relationship between the axis 18 and the reference axis of the workpiece or component 11 and 10 respectively. However, there is the possibility of a departure from true concentric relationship, either by way of a radial excursion of the reference axis of either component with respect to the axis 18, or by way of an angular deviation of the reference axis of either component with respect to the axis 18. Consequently there is a possibility that when a fused union has been formed between the two components, the reference axis of the component 11 will not be concentric with the reference axis of the component 10.

Since it is the reference axis of the component 11 which is brought accurately into concentric relation with the hub axis when the wheel is in use, any such error can produce quite severe unbalance, bearing in mind that the component 10 is the component which carries the relatively heavy tyre.

Accordingly pilot parts are provided on the workpiece supports 16 and 19 respectively for eliminating or reducing the possibility of this error.

In the form shown in FIG. 1 a male pilot part 36 is provided on the workpiece support 16 comprising an axially projecting spindle having a somewhat rounded terminal or nose portion 37.

On the workpiece support 19 the pilot parts 38 is of female form and is constituted by the inwardly radially presented surface 38a.

The radial dimensions of the pilot parts 36 and 38 provide an accurate sliding fit between the two parts and ensure the necessary degree of accuracy with respect to radial positioning of one support 16 relatively to the other support 19. The axial length of the parts 36 and 38 ensures the necessary accuracy as regards relative angular position between the two supports 16 and 19.

As illustrated, the pilot parts are in engagement throughout the friction welding operation. In this arrangement the male part 36 may be formed with a plurality of angularly spaced local hard parts on its radially presented surface for engagement with a continuous inwardly presented radial surface at 38.

The pilot parts may be arranged so that they come into engagement only during the stage of the welding operation in which relative rotation between the workpiece support has ceased and forging pressure is exerted by the means producing axial movement in the direction of the arrow A.

Figure 5:
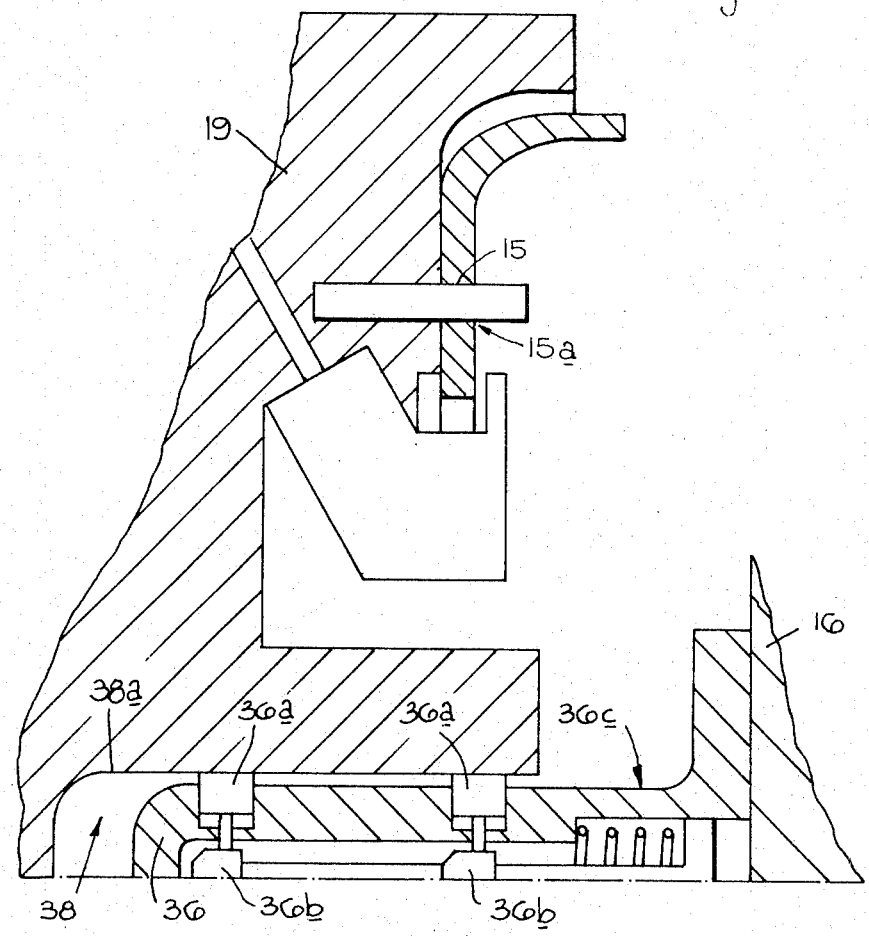

This is illustrated in FIG. 5 wherein the male pilot 36 has pads 36a movable radially to engage the surface 38a by cams 36b operated by a piston and cylinder unit 36c energised to move the pads to their outer positions only in response to the onset of forging pressure in the piston and cylinder unit 36c. This may be connected in a suitable hydraulic circuit with the forge cylinder 3.

In carrying out a friction welding operation it will be understood that the first stage consists of rotation of the support 19 with the components 10 and 11 maintained in pressure contact in the plane 12 under sufficient pressure to generate heat in layers adjacent to the contact faces of both components. This relative rotation is continued until the temperature of the material is such as to admit of a fused union being formed.

Rotation is then either stopped by application of a brake means to the workpiece support 19 or the latter is merely allowed to come to rest and thereafter pressure between the contact faces is maintained or increased as necessary to ensure establishment of the fused union.

It is during this last mentioned stage that it is of particular importance to ensure the required concentric relationship between the two components 10 and 11.

As illustrated the contact faces on each component are planar and lie in a plane which is at right angles to the axis 18.

Contact faces could, however, be frusto-conical.

In the first case the positional relationship of the components 10 and 11 is determined wholly by the relative positional relationships between the workpiece supports 16 and 19 which in turn is controlled by the pilot parts 36 and 38. Due to the planar form of the contact faces there is no obstruction to positional adjustment of one component relatively to the other arising at the contact faces in a direction radial to the axis 18. Ability of one workpiece to undergo angular adjustment relative to the other is ensured by reason of the fact that material in the layers adjacent to the contact faces will be softened preparatory to application of the forging pressure and, therefore, any accommodation of the workpiece which is necessary to conform to the relative angular positions occupied by the supports 16 and 19 can take place without difficulty.

If the contact faces are of frusto-conical or some other form which intrinsically provides a degree of constraint to radial displacement, there will likewise be no difficulty in accommodation of the workpieces to each other in accordance with the radial and angular positions occupied by the supports 16 and 19 because of the establishment of softened layers in the workpieces adjacent to the contact faces.

Instead of providing angular location of the component 11 by means of the face 31, the holes 15a in the component 11 may be of frusto-conical form or include frusto-conical portions which cooperate with frusto-conical collars or shoulders on the pins 30. In this case such collars or shoulders would provide both radial and angular location.

Figure 2:
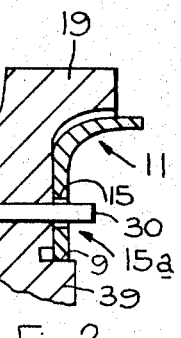
FIGS. 2, 3, 4 and 5 are fragmentary views illustrating modifications of the method and apparatus.

In some cases, as illustrated in FIG. 2 where parts corresponding to those already described are designated by like references, the reference surface which provides radial location for the disc portion of the wheel is constituted not by the boundaries of the holes but by the inner edge surface 9 presented by an aperture in the centre of the disc portion.

In this case the workpiece support 19 may be formed with a locating boss 39 to engage the edge surface 9. The pins 30 would then have clearance with respect to the holes 15a and would perform purely a driving function. For simplicity the jaw members 32 have been omitted in FIG. 2.

Figure 3:
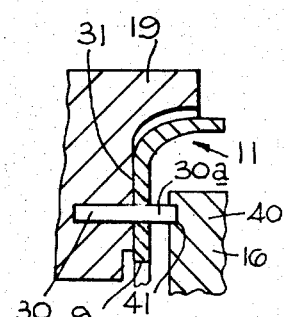

FIG. 3 illustrates a further modification wherein parts corresponding to those already described are designated by like reference numerals.

In this case the pilot parts on the respective workpiece supports are constituted by end portions 30a of the pins 30 and by a boss 40 having an annular groove 41. The pins 30 and the grooves 41 may be so positioned that they come into cooperation with each other only when the respective workpiece supports 16 and 19 undergo relative axial movement as a result of upset between the components 10 and 11 under the forging pressure.

In yet another alternative illustrated in FIG. 4 wherein again parts corresponding to those already described are designated by like reference numerals, the pilot parts constituted by a sleeve portion 42 on the body of the workpiece support 16, the inner surface 43 of which contacts the outwardly presented surface 44 of a male pilot part 45 on the body of the workpiece support 19.

Figure 4:
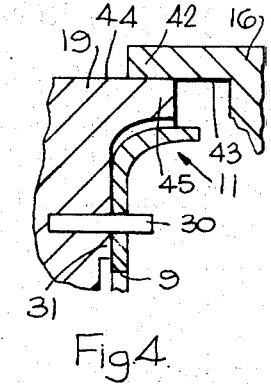

It will be understood that the pilot parts illustrated in FIGS. 3 and 4 may be provided in substitution for, or additionally to, the pilot parts illustrated in FIGS. 1 and 5.

In some cases it may be convenient to effect welding of the components 10 and 11 before drilling of the holes 15a in the latter and/or before forming a central aperture therein.

In that case the workpiece support 19 can be modified to hold the component 11 by any holding face portions thereon capable of locating the component angularly with respect to its axis, such, for example, as the face portion 22. The holes 15a and/or the central aperture may be formed after performance of the welding operation.

The position of any reference face portion created by such formation would, of course, then be carefully determined with respect to the reference face of the rim portion, e.g. the tyre seating faces 20, 21.

Although the method, apparatus, and product illustrated is a type of wheel known as a flat-based wheel, the invention is applicable to wheels of the type known as well-based wheels, as well as to workpieces generally which are required to be friction welded to each other in accurately coaxial relation.

Again, although, as regards wheels, friction welding has been disclosed in the embodiments described with reference to the drawings, it will be understood that other welding methods may be used, namely flash butt welding, submerged arc welding, electron beam welding. Where these require rotation of the components structures similar to those disclosed with appropriate modification to rotate both holders may be used.

I claim:

1. In a method of friction welding to each other workpieces, each of which is of a form to define an axis and includes a holding face having a fixed dimensional relation to said axis, the method comprising holding the workpieces in respective supports mounted on a body of a friction welding machine, moving at least one of said supports relative to the other to bring respective contact faces of said workpieces into mutual contact under pressure and to rub said contact faces together under pressure, stopping said movement when layers of workpiece material adjacent to said contact faces have been raised to welding temperatures, and applying forging pressure to cause the workpieces to become welded to each other, the improvement in which:
 a. said holding step comprises engaging a respective workpiece support with said holding face on the workpiece,
 b. and said method comprises accurately controlling the positional relation between respective axes of the workpieces by mutually engaging respective pilot parts on said workpiece supports with each other.

2. A method according to claim 1 wherein:
 a. said moving step comprises rotating one of said workpieces about its axis relative to the other workpiece to rub said contact faces together,
 b. said method comprises maintaining said workpiece axes in at least approximate co-axial relation during said rotating operation, and
 c. said method comprises establishing more accurate co-axial relation during application of said forging pressure by said mutual engagement of said pilot parts.

3. A method according to claim 2 comprising the steps of: holding said pilot parts out of said mutual engagement prior to application of said forging pressure, and bringing said pilot parts into said mutual engagement during application of said forging pressure.

4. In a method of manufacturing a wheel comprising a rim portion adapted to receive a pneumatic tyre, and a disc portion connected to and supporting said rim portion, said rim portion including a reference face constituted by tyre bead seating surfaces and defining an axis of the rim portion, and said disc portion including a reference face defining an axis of the disc portion, which method includes the steps of welding to each other a first component which includes the reference face of the disc portion, and a second component which includes the reference face of the rim portion, each of said components having a second face thereof which is so dimensionally stable relative to said reference face as to avoid significant positional inaccuracy of the second face relative to the reference face, the improvement comprising the steps of:
 a. providing a support for each of said components,
 b. engaging a holding face of each of said components with a respective support prior to said welding step, said holding face being selected from the group consisting of said reference face of the component and said second face thereof,
 c. holding each of said components during the welding step by engagement of the respective support with said holding face, and
 d. controlling the positional relation between said supports during the welding step.

5. A method according to claim 4 and comprising:
 a. providing a mounting body for said supports to at least partially control the positional relation between said supports,
 b. providing said supports with mutually engageable co-operative pilot parts,
 c. and establishing more accurate control of the positional relation between said supports by bringing said co-operative pilot parts on said supports into mutual engagement.

6. A method according to claim 5 wherein said components have respective contact faces, said method comprising:

a. moving at least one of said components relative to the other to produce rubbing contact between said contact faces under pressure, and b. stopping said relative movement and subjecting said components to forging pressure over their contact faces while said pilot parts on said respective supports are in mutual engagement.

7. A method according to claim 6 wherein:

a. said moving step comprises rotating one of said components about its axis relative to the other component to rub said contact faces together, b. said method comprises maintaining said axes of the components in at least approximate coaxial relation during said rotating operation, c. and said method comprises establishing more accurate coaxial relation during application of said forging pressure by said mutual engagement of said pilot parts.

8. A method according to claim 4 wherein said first component has holes extending therethrough at angularly spaced positions about its axis, said method comprising:

a. providing a support, for said first component, which is engageable with said holes;

b. engaging said support for said first component with said holes;

c. and maintaining said support in engagement with said holes during said welding step.

9. A method according to claim 8 wherein said first component has an axially presented side face adjacent said holes, said method comprising:

a. engaging said support for said first component with said side face;

b. and maintaining said support in engagement with said side face during said welding step.

10. A method according to claim 4 wherein the reference face on said first component includes a central aperture having an edge face, said method comprising:

a. engaging said support for the first component with said edge face;

and maintaining said support in engagement with said edge face during said welding step.

* * * * *